United States Patent
Kumar et al.

(10) Patent No.: US 7,778,373 B2
(45) Date of Patent: Aug. 17, 2010

(54) SAMPLING RATE MISMATCH SOLUTION

(75) Inventors: Vivek Kumar, San Jose, CA (US); Joakim Linde, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 899 days.

(21) Appl. No.: 11/492,210

(22) Filed: Jul. 25, 2006

(65) Prior Publication Data

US 2007/0172011 A1 Jul. 26, 2007

Related U.S. Application Data

(60) Provisional application No. 60/760,932, filed on Jan. 23, 2006.

(51) Int. Cl.
*H04L 7/00* (2006.01)
*H04L 25/00* (2006.01)
*H04L 25/40* (2006.01)

(52) U.S. Cl. .............. 375/372; 375/371; 375/373; 375/376; 375/355; 713/503; 370/505; 370/229

(58) Field of Classification Search ......... 375/371–373, 375/376, 355; 713/503; 370/505, 229
See application file for complete search history.

(56) References Cited

U.S. PATENT DOCUMENTS

| 5,825,778 | A  | * | 10/1998 | Hauge | ............ | 370/473 |
| 6,882,661 | B1 | * | 4/2005  | Creedon et al. | ..... | 370/505 |
| 6,888,840 | B1 | * | 5/2005  | Ramaswamy et al. | ..... | 370/412 |
| 6,907,541 | B1 | * | 6/2005  | Padmanabhan et al. | ..... | 713/503 |
| 7,042,840 | B2 | * | 5/2006  | Howald et al. | ..... | 370/229 |

* cited by examiner

*Primary Examiner*—Phuong Phu
(74) *Attorney, Agent, or Firm*—Sterne, Kessler, Goldstein & Fox P.L.L.C.

(57) ABSTRACT

Methods and apparatuses for compensating for differences in communication system transmit and receive clock signal frequencies include buffer timing modification and sample addition. In buffer timing modification, a buffer clock signal is interrupted as needed to slow the rate of data through the buffer. In sample addition, pseudo samples are inserted into a data stream to compensate for timing differences.

22 Claims, 8 Drawing Sheets

SAMPLING RATE MISMATCH SOLUTION

CROSS REFERENCE TO RELATED APPLICATIONS

This application claims benefit of U.S. Provisional Patent No. 60/760,932, filed on Jan. 23, 2006, which is incorporated by reference herein in its entirety.

FIELD OF THE INVENTION

The present invention is generally directed to communication systems. More particularly, the invention relates to a sample rate mismatch solution.

BACKGROUND OF THE INVENTION

Wireless communication transceivers are rapidly becoming more portable and interoperable. Concurrent is a drive to reduce transceiver size, weight, and power consumption. Transceivers are now portable to the point where they can be worn on and/or in a person's ear. Additionally, standards such as Bluetooth are providing interoperability between devices produced by different manufacturers.

However, the continued drive for miniaturization and interoperability is constrained. Common audio and video sampling rates are not a harmonic of one frequency. Thus, multiple clocks are necessary to code and decode all common sampling rates for streaming data. Use of multiple clocks to accommodate all common sample rates leads to cost increases in parts, assembly, and design. Use of multiple clocks also leads to increased power consumption, weight, and heat. The effect of increases in these parameters is acute when the receiver is integrated into an earphone that is worn on and/or in the ear. Thus, use of multiple clocks is a constraint on portability and interoperability.

Alternatively, a single master clock can be used to generate a plurality of harmonic or sub-harmonic clocks. This tends to reduce costs. However, it is likely that none of the harmonic or sub-harmonic clocks will match the sample rate of incoming data. Those sample rates which are not a harmonic of the master clock frequency must then be approximated. This can lead to "buffer over flow" when a receiver clock is faster than a transmitter clock, or "buffer running dry," also referred to herein as "buffer stall," when the receiver clock is slower than the transmitter clock.

What are needed therefore are methods and systems for reducing buffer running dry.

BRIEF SUMMARY OF THE INVENTION

The present invention is directed to methods and apparatuses for compensating for differences in communication system transmit and receive clock signal frequencies. These include buffer timing modification and sample addition. In buffer timing modification, a buffer clock signal is interrupted as needed to slow the rate of data through the buffer. In sample addition, pseudo samples are inserted into a data stream to compensate for timing differences.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

As introduced above, the present invention involves an approach to compensating for differences in communication system transmit and receive sample frequencies by modifying buffer timing and/or sample addition. FIGS. 3-8, described below, illustrate this approach.

Introduction

Figure 1:
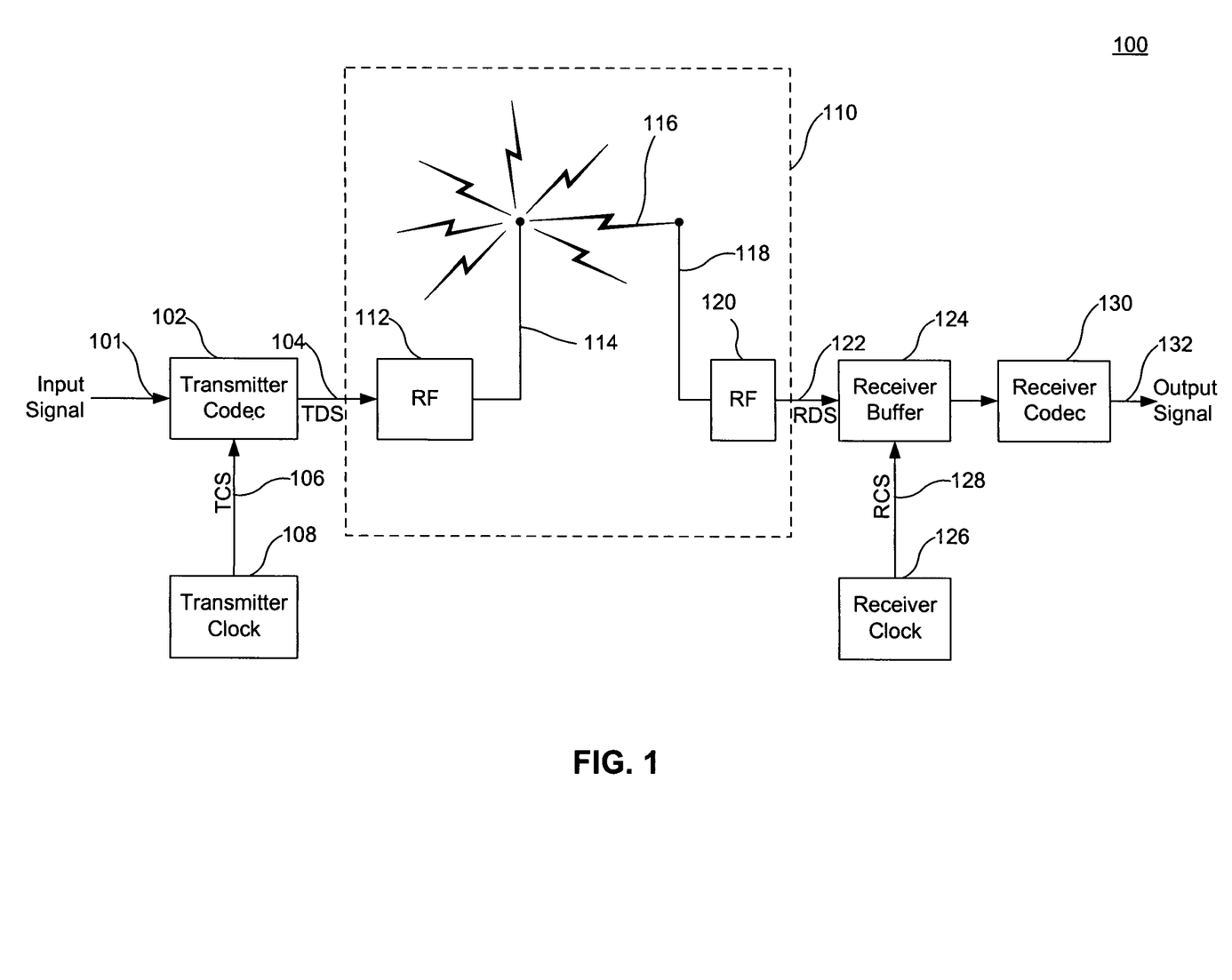
FIG. 1 is a block diagram illustrating part of a typical communication system.

FIG. 1 is a block diagram illustrating part of a communication system 100. The communication system 100 transports a streaming audio signal and/or a streaming video signal. An analog input signal 101 is input to a transmitter codec 102. The transmitter codec 102 digitally samples the analog input signal 101 to create a transmitter digital signal (TDS) 104. The transmitter codec 102 sample rate is determined by a frequency of a transmitter clock signal (TCS) 106, which is determined by a transmitter clock 108. The TCS 106 is usually a lower-frequency harmonic of the transmitter clock 108. The transmitter clock 108 is typically a crystal-controlled oscillator. The TDS 104 is transported by a communication path 110. The communication path 110 is implemented using at least one of wires, cables, fiber optics, cellular phone links, radio frequency (RF) links, and/or other communication means.

FIG. 1 shows a communication path 110 comprising an RF link. The TDS 104 undergoes RF modulation and amplification in an RF section 112 and then is broadcast via a transmitter antenna 114. The transmitter antenna 114 transmits an electro-magnetic wave 116. The electro-magnetic wave 116 is received by a receiver antenna 118. A receiver RF section 120 amplifies and demodulates the electro-magnetic wave 116 to create a receiver digital signal (RDS) 122.

The RDS 122 is input to a receiver buffer 124 where it is cached. A receiver clock 126 generates a receiver clock signal (RCS) 128 that clocks the RDS 122 data through the receiver buffer 124. The receiver buffer 124 sample rate is determined by the rate of the RCS 128, which is determined by the receiver clock 126. The receiver clock 126 is typically a crystal-controlled oscillator. The RCS 128 is typically a lower-frequency harmonic of the receiver clock 126. The RDS 122 is then input to a receiver codec 130, which converts the RDS 122 to an analog output signal 132. When coupled to the receiver codec 130, the receiver buffer 124 may also be described as a codec buffer.

A transmitter or receiver may be a component in a larger system having a master clock. The master clock may provide a clock signal for functions other than receiver buffer timing such as computer timing. If only one master clock is used in a receiver, all of the common sampling rates cannot be accurately decoded. Those sample rates which are not a harmonic of the master clock frequency are approximated. Therefore, in a receiver with only one master clock, the approximated sampling rate is either higher or lower than the actual sample rate of the transmitted signal.

The difference in transmitter and receiver sample rates causes one of two problems. First, if the receiver sampling rate is less than the transmitter sampling rate, the receiver will drop data because the receiver's buffer will not process the received signal fast enough. In FIG. 1, for a streaming data signal, the RDS 122 is present at the input to the receiver buffer 124 at a RDS data rate determined by the transmitter codec 130 sample rate, which in turn is determined by the TCS 106. However, presence of the RDS 122 at the input to the receiver buffer 124 does not mean the RDS 122 enters, or is clocked through, the receiver buffer 124 at the RDS data rate. The RDS data rate into and out of the receiver buffer 124 is determined by the receiver clock 126. If the RCS 128 rate is less than the TCS 106 rate, the receiver will drop RDS 122 data because the receiver buffer 124 will not process the RDS 122 fast enough. This condition is also known as buffer overflow and results in loss of intelligence from the RDS 122. For streaming audio, the effect is manifested in at least the form of lost sections of audio and/or skipping. For streaming video, the effect is manifested in at least the form of lost sections of video and/or skipping.

Figure 2:
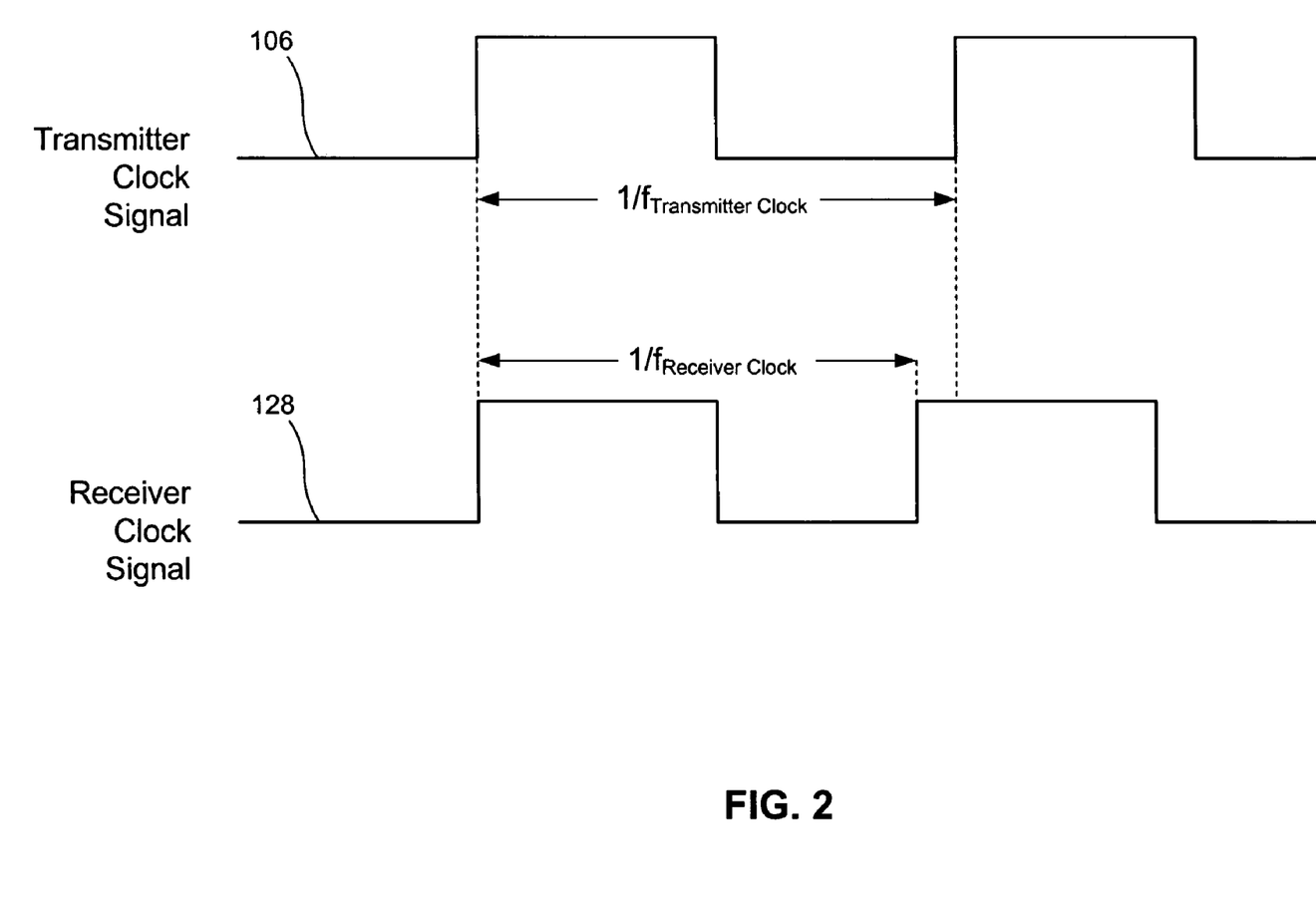
FIG. 2 is a timing diagram that illustrates differences in transmitter and receiver sample rates.

Second, if the receiver sample rate is greater than the transmitter sample rate, the receiver will stall because the receiver's buffer processes the received signal too quickly. If the RCS 128 rate is greater than the TCS 106 rate, as shown in FIG. 2, the receiver will stall because the receiver buffer 124 processes the RDS 122 faster than the RDS 122 appears at the input to the receiver buffer 124. This condition is also known as a buffer running dry and, though it does not result in loss of intelligence from the RDS 122, it does result in an analog output signal 132 having periods of time that do not contain any intelligence. For streaming audio, the effect is manifested in the form of periods of silence in the analog output signal 132. For streaming video, the effect is manifested in the form of artifacting in the analog output signal 132.

Common audio sample rates include 8 KHz, 32 KHz, 44.1 KHz, 48 KHz, and 88.2 KHz. Thus, the 8 KHz, 32 KHz, and 48 KHz audio sample rates are easily encoded and decoded with a master clock operating at 12 MHz or a harmonic of 12 MHz. However, by using only one master clock, all of the sampling rates cannot be easily implemented. For example, a 12 MHz master clock can only approximate the 44.1 KHz sample rate as 44.1176 KHz and the 88.2 KHz sample rate as 88.2353 KHz. Similarly, a 16.9344 MHz master clock can produce 44.1 KHz and 88.2 KHz, but can only approximate the 8 KHz sample rate as 8.0182 KHz.

Use of these slightly higher approximated sample rates can result in a receiver buffer running dry due to the RCS rate being higher than the TCS rate. Therefore, instead of one master clock, two clocks are commonly used to accommodate all common audio sample rates of 8 KHz, 32 KHz, 44.1 KHz, 48 KHz, and 88.2 KHz. Use of multiple clocks to accommodate all common audio sample rates leads to cost increases in parts, assembly, and design. Use of multiple clocks also leads to increased power consumption, weight, and heat. The effects of increases in these parameters are more acute when the receiver is integrated into an earphone that is worn on and/or in the ear.

Accordingly, methods and systems are provided herein for preventing buffer stall. The methods and systems can also be used to prevent buffer overflow by using a clock signal that is higher than a data sample rate, thus preventing buffer overflow, and using the methods and systems described herein to prevent buffer stall.

The methods and systems include methods and systems for buffer timing modification and methods and systems for sample addition.

Buffer Timing Modification

Figure 3:
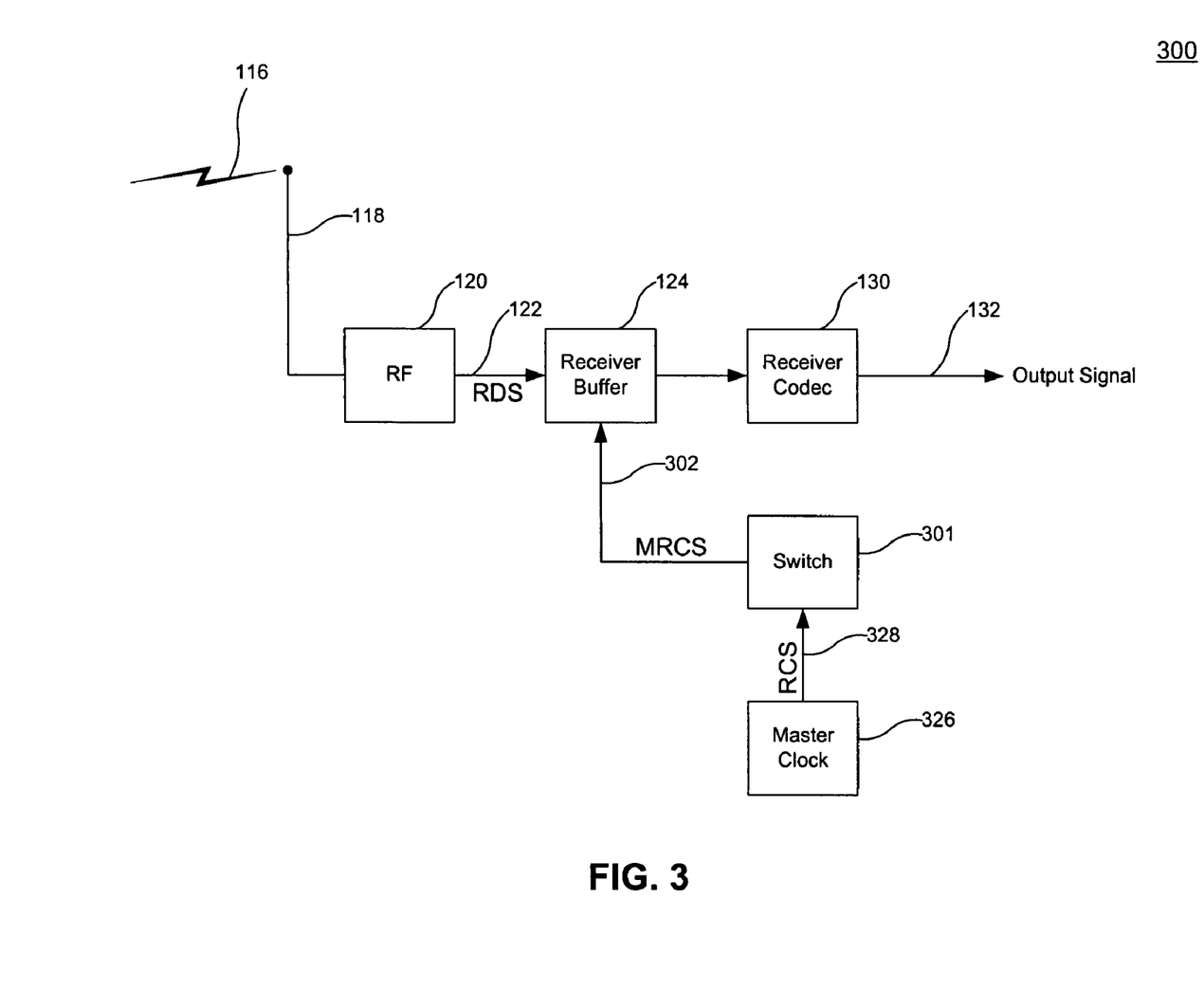
FIG. 3 is a block diagram of a receiver including a switch.

FIG. 3 illustrates an example of a buffer timing modification system 300, where an RCS 328 is an approximated RCS 328 sample rate that is derived from a master clock 326. The example is described with reference to FIG. 1. The invention is not, however, limited to the example of FIG. 1. An approximated sample rate includes a sample rate that is not equal to a TCS 106 sample rate. An approximated sample rate also includes, and is not limited to, a sample rate that is within ±10% of another sample rate used to sample an analog signal during analog to digital conversion. For example, if an analog signal is sampled at 44.1 KHz, an approximated sample rate is 44.1176 KHz. In another example, if an analog signal is sampled at 88.2 KHz an approximated sample rate is 88.2353 KHz. In another example, a master clock 326 frequency is at least one of 12 MHz, a harmonic of 12 MHz, 16.9344 MHz, and a harmonic of 16.9344 MHz. In yet another example, a master clock 326 is a crystal-controlled oscillator.

In the example illustrated in FIG. 3, a switch 301 is placed in the RCS 328 flowpath between the master clock 326 and a receiver buffer 124. The switch 301 is controlled to enable or disable application of the RCS 328 to the receiver buffer 124. This results in the switch 301 producing a modified receiver clock signal (MRCS) 302 for input to the receiver buffer 124. The output of the receiver buffer 124 is input to a receiver codec 130. In an example, the receiver codec 130 receives audio samples from the receiver buffer 124. In another example, the receiver codec 130 receives video samples from the receiver buffer 124.

If the RCS 328 is disabled for at least one RCS 328 cycle, the effect is that RDS 122 data is cycled into and through a receiver buffer 124 at an average rate slower than an approximated RCS 328 sample rate. The MRCS 302 cycles data into and through the receiver buffer 124 at an average rate equal to a TCS 106 sample rate. Thus, modifying the RCS 328 with switch 301 permits an approximated RCS 328 to be used with common audio sample rates. This allows the use of only one master clock per transceiver, while accommodating all common audio, video, and data sample rates, without receiver buffer 124 overflow and without receiver buffer 124 stall. By eliminating a need for circuitry associated with an additional receiver clock 126, transceiver size, weight, and power consumption are reduced.

In an example, the switch 301 may be in the form of a logic gate, relay, transistor, semiconductor switch, controllable electron valve, electro-mechanical switch, or a computer-readable medium carrying at least one instruction for execution by at least one processor. In another example, the switch 301 is at least one of an AND gate, a NAND gate, an XOR gate, and an XNOR gate.

In an example, the switch 301 may be controlled by any combination of a control circuit, a control system, a control apparatus, a computer processor, a computer-readable medium carrying at least one instruction for execution by at least one processor, a logic circuit, a digital circuit, or an analog circuit. In an example, a control circuit for controlling switch 301 includes a buffer monitoring system, such as a threshold detector, coupled to a receiver buffer 124. The threshold detector detects at least one of a quantity of data in the receiver buffer 124, an RDS 122 rate, and an MRCS 302 rate. Output from the buffer monitoring system is used to control the switch 301, to prevent buffer stall.

In examples, actuation of the switch 301 may occur on a periodic or on an as-needed basis. Timing of switch 301 actuation may be variable to adjust to varying data rates of an RDS 122. Switch 301 actuation may be based upon a control signal identifying a rate of the RDS 122, an MRCS 302, and/or based upon a control signal output from a receiver RF section 120. The switch 301 may also be actuated based on maintaining a fixed ratio of RCS 328 cycles to a data rate present at a receiver buffer 124 input to ensure a constant average MRCS 302 rate. The switch 301 may be actuated based on maintaining a fixed ratio of RCS 328 cycles to receiver RF section 120 data output rate.

In an example, the switch 301 is actuated to disable an RCS 328 from clocking a receiver buffer 124 for an average of fourteen RCS 328 cycles during one-hundred and twenty-eight data samples present at the receiver buffer 124 input.

Figure 4:
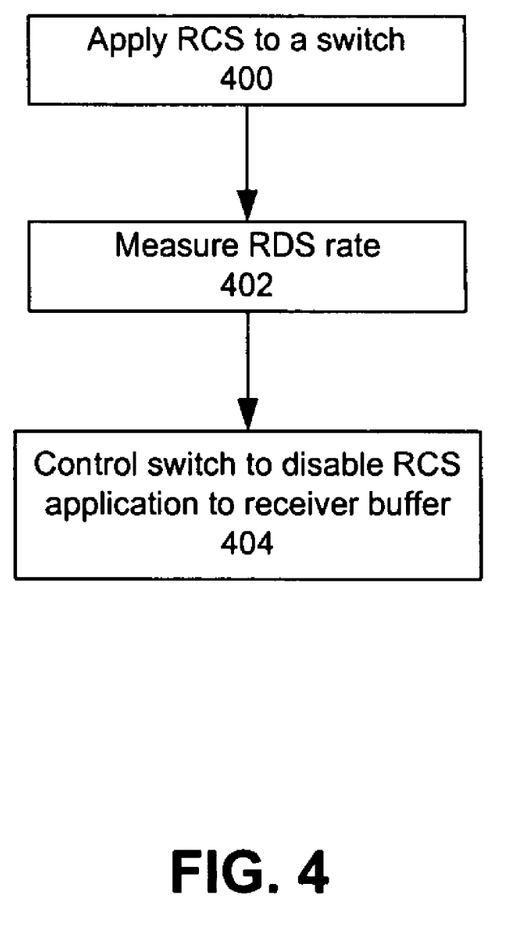
FIG. 4 is a flow chart of a method of switch operation.

FIG. 4 shows a high-level flowchart of an example method of RCS 328 modification. The flowchart is described with reference to FIGS. 1 and 3. The invention is not, however, limited to the examples of FIGS. 1 and 3. At step 400, RCS 328 is applied to switch 301. At step 402, an RDS 122 rate is measured. At step 404, the switch 301 is controlled to disable application of the RCS 328 to a receiver buffer 124. In an embodiment of step 404, switch 301 is controlled to disable application of the RCS 328 to the receiver buffer 124 for an average of fourteen RCS 328 cycles over one-hundred and twenty-eight RDS 122 samples. The invention is not, however, limited to this example. Processing then returns to step 404. The invention is not limited to this example.

In an example, actuation of switch 301 is based upon both low-high and high-low transitions of an RCS 328 to increase accuracy of an MRCS 302 relative to an RDS 122. Thus, switch actuation may be based on half-cycles of the RCS 328. The MRCS 302 rate need not always exactly match a RDS 122 rate. However, a relatively high level of accuracy of the MRCS 302 relative to the RDS 122 is desirable so the average MRCS 302 frequency input to a receiver buffer 124 is substantially equal to an average RDS 122 rate, input to the receiver buffer 124, in order to prevent running dry or stalling. In an embodiment, an accuracy of a MRCS 302 rate relative to a RDS 122 rate is at least 1000 parts per million (ppm). In another embodiment, a desired accuracy of an MRCS 302 rate relative to a RDS 122 rate is no worse than 250 ppm.

In another example, the switch 301 is controlled based upon a quantity of data in receiver buffer 124. If receiver buffer 124 has a high quantity of data, the switch 301 is controlled to prevent dropping clock cycles from an RCS 326, thus passing a larger quantity of data into the receiver buffer 124.

In an embodiment, the switch effectively distributes dead time that results from clock mismatch across a relatively long period of time. The distributed dead time is generally imperceptible to users.

In an example, the flowchart of FIG. 4 may be implemented by any combination of a control circuit, a control system, a control apparatus, a computer processor, a computer-readable medium carrying at least one instruction for execution by at least one processor, a logic circuit, a digital circuit, or an analog circuit.

Figure 5:
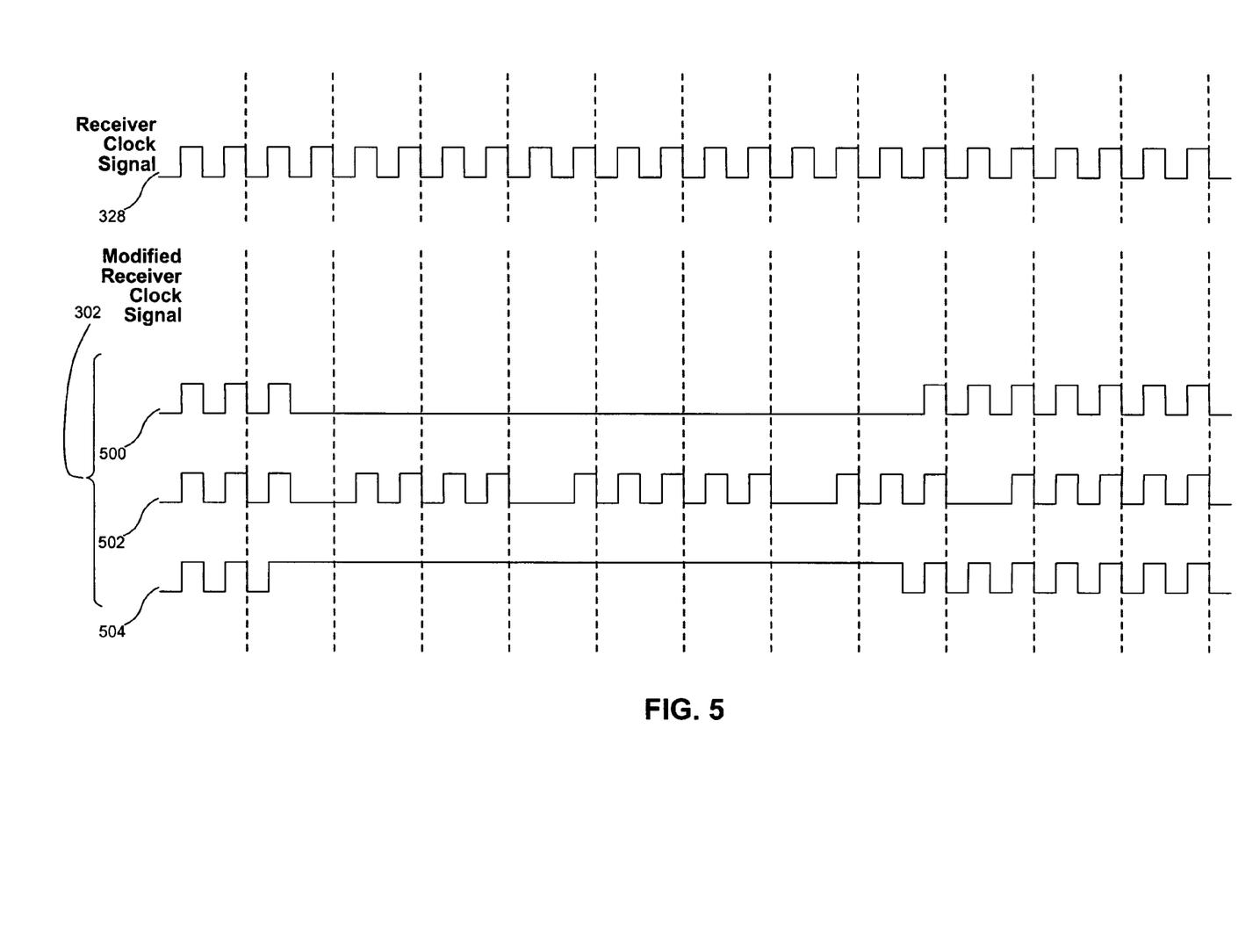
FIG. 5 is a timing diagram of an exemplary receiver clock signal and modified receiver clock signals.

FIG. 5 illustrates an exemplary RCS 328 input and exemplary MRCS 302 outputs 500, 502, 504 from the switch 301. The RCS 328 may be disabled for multiple RCS 328 cycles, as shown in exemplary MRCS 302 output 500 and exemplary MRCS 302 output 504, or for a single RCS 328 cycle as shown in exemplary MRCS 302 output 502. Disabling and enabling of the RCS 328 need not occur in a periodic manner and may occur on an as-needed basis. When the RCS 328 is not passed to a receiver buffer 124, the MRCS 302 may be a constant high or low value as shown in exemplary MRCS 302 output 500 and exemplary MRCS 302 output 504.

In an example, a buffer timing modification system is part of an earpiece or headset that is Bluetooth-enabled for communicating among Bluetooth-enabled devices. In an example, a buffer timing modification system, a switch, master clock, and/or receiver buffer is part of a wireless receiver, wireless transmitter, and/or wireless transceiver. In another example, a buffer timing modification system, a switch, master clock, and/or receiver buffer is part of a computer, phone, telecommunications device, communication device, personal data assistant, television, and/or radio. In another example, a buffer timing modification apparatus and method as described herein are used in a transmitter with a transmitter buffer.

In another example, analog input signals are sampled at 44.1 KHz in a transmitter. A receiver master clock frequency is 12 MHz. Thus, an approximated RCS rate is at least one of 44.1176 KHz and a frequency higher than 44.1 KHz. A switch is controlled to create an MRCS with an average frequency of 44.1 KHz.

In another example, analog input signals are sampled at 88.2 KHz in a transmitter. A receiver master clock frequency is 12 MHz. Thus, an approximated RCS rate is at least one of 88.2353 KHz and a frequency higher than 88.2 KHz. A switch is controlled to create an MRCS with an average frequency of 88.2 KHz.

Sample Addition

Figure 6:
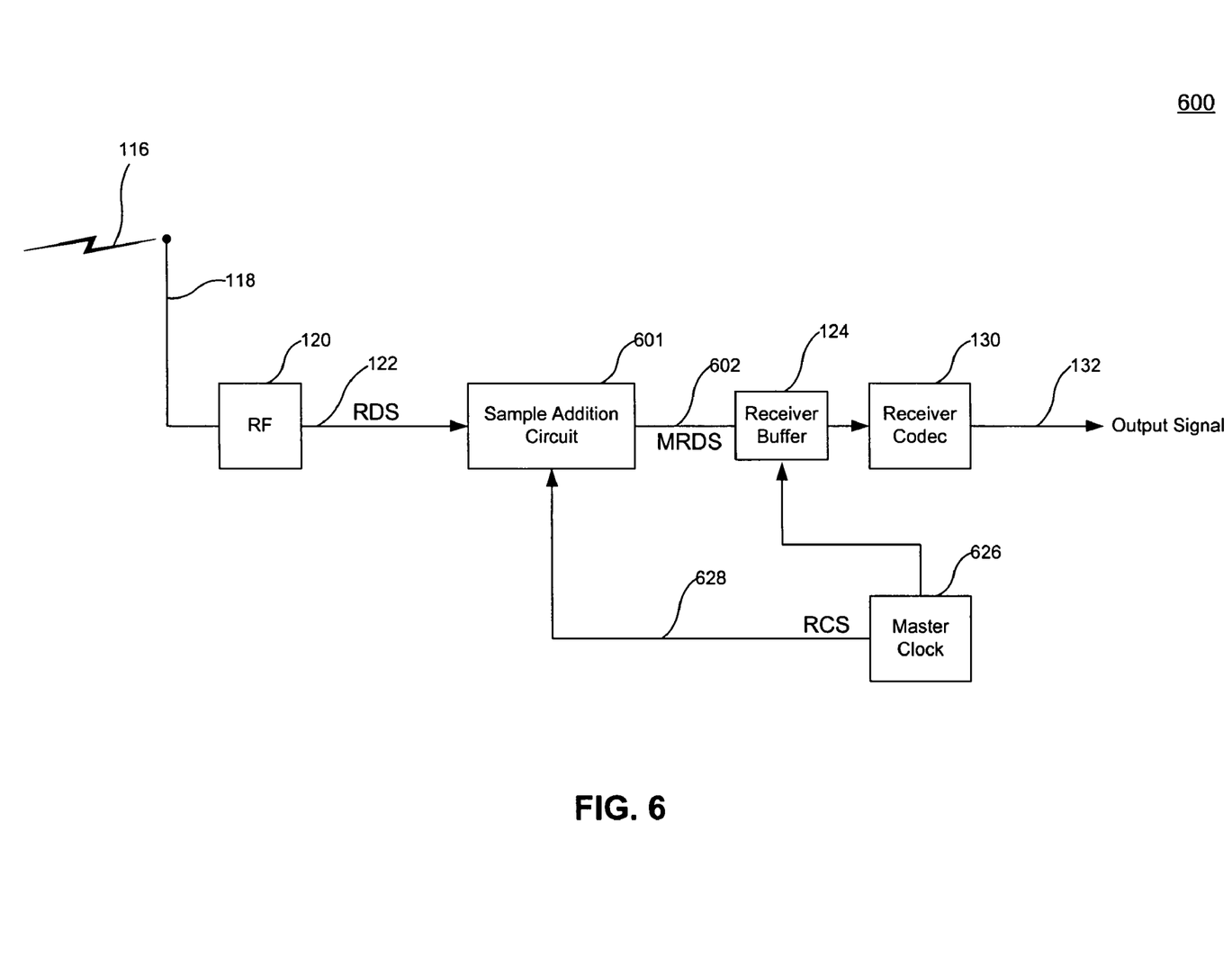
FIG. 6 is a block diagram of a receiver including a sample addition circuit.
Figure 7:
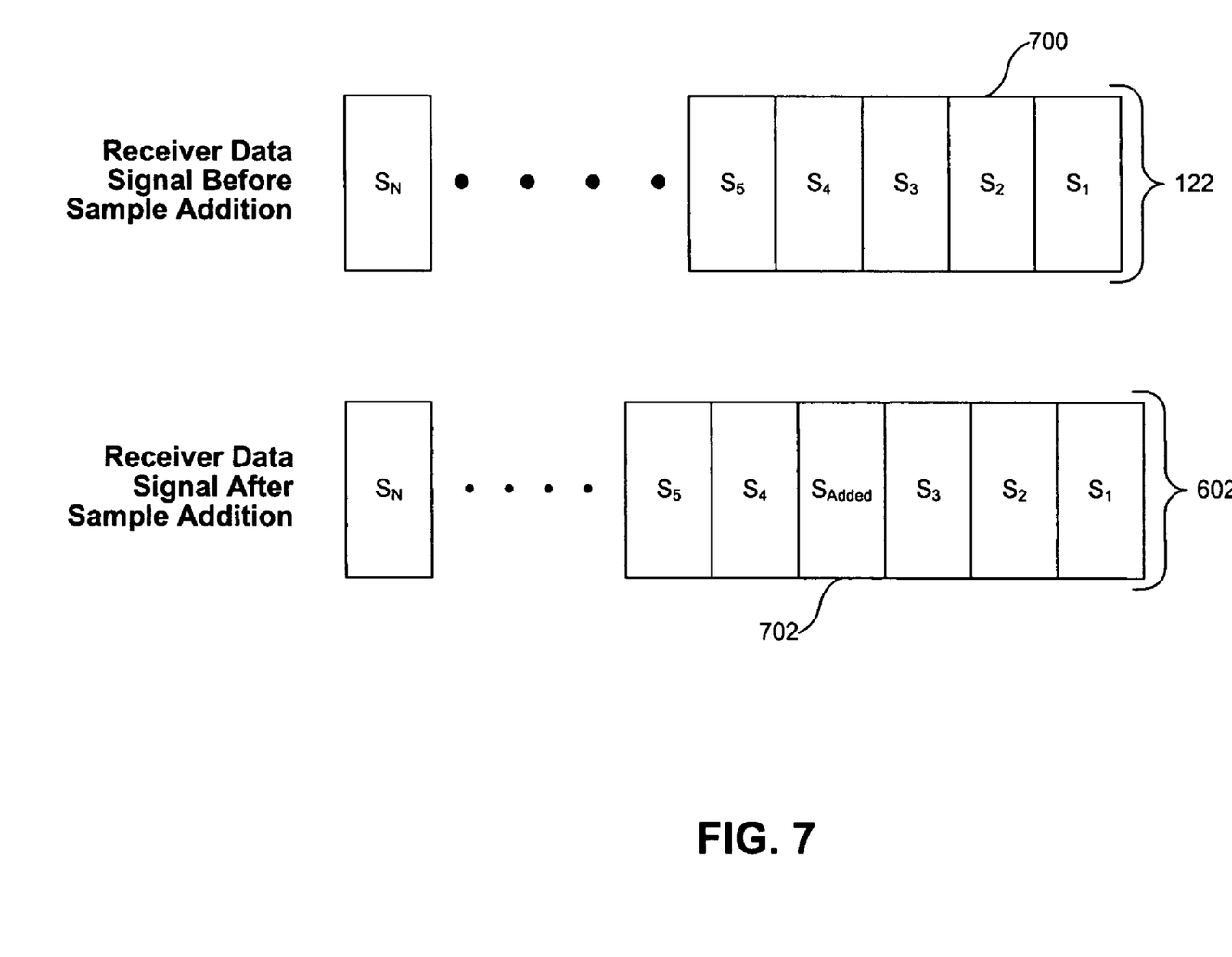
FIG. 7 illustrates bit addition and effect on the receiver data signal.

FIG. 6 illustrates a receiver 600 having a sample addition circuit 601 provided upstream from the receiver coder/decoder (codec) 130. An RDS 122 includes samples, illustrated in FIG. 7 as samples 700. The sample addition circuit 601 alters the RDS 122, as shown in FIG. 7, by inserting additional samples 702 into the RDS 122 to produce a modified receiver digital signal (MRDS) 602. Additional samples can include, without limitation, bits and groups of bits containing little or no significant intelligence that are inserted into a digital data stream. Because the MRDS 602 contains more samples 700 than the RDS 122, a receiver buffer 124 accommodates a master clock 626 that provides an approximated sample rate RCS 628 without the receiver buffer 124 running dry. Therefore, insertion of additional samples 702 accommodates an approximated sample rate RCS 128. Insertion of additional samples 702 also permits use of only one master clock for the receiver while accommodating various audio sample rates without receiver buffer 124 stall. Sample addition can also be used to prevent buffer overflow by using a clock signal that is higher than a data sample rate, thus preventing buffer overflow, and using sample addition to prevent buffer stall.

The output of the receiver buffer 124 is input to a receiver codec 130. In an example, the receiver codec 130 receives audio samples from the receiver buffer 124. In another example, the receiver codec 130 receives video samples from the receiver buffer 124.

The addition of samples does lead to brief periods of time where no intelligent information is present in an output signal 132. For example, a brief period of time may last from 27 microseconds to 0.27 milliseconds. This time is short in duration so it has no detrimental effect on processing of intelligent information by circuitry downstream of the output signal 132. In another example, the brief period of time where no intelligent information is present in an output signal 132 is short in duration so it is unnoticeable by a person listening to audio transported by the output signal 132 and/or watching video transported by the output signal 132.

Figure 8:
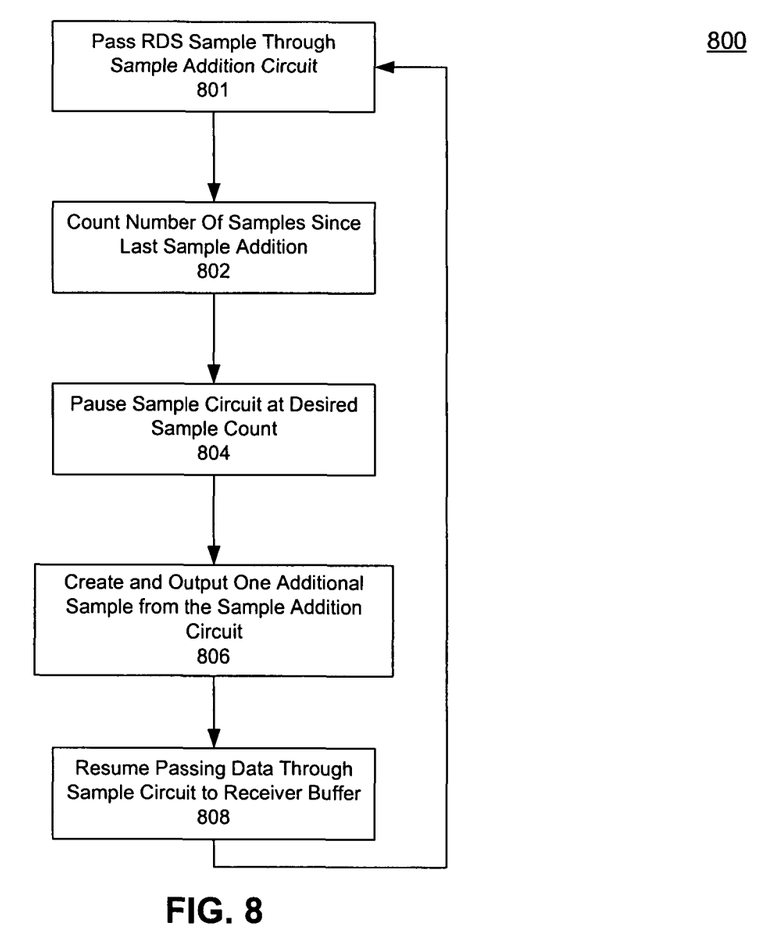
FIG. 8 is a flowchart of a method of sample addition.

FIG. 8 shows a high-level flowchart 800 of an example method for adding a sample 702. The flowchart is described with reference to FIG. 6. The invention is not, however, limited to the examples of FIG. 6. At step 801, one or more RDS 122 data samples 700 are passed through a sample addition circuit 601. At step 802, a number of data samples 700 of the RDS 122 passed through the sample addition circuit 601 since the prior addition of a sample 702 is counted. At step 804, when the count of data samples 700 reaches a desired count, passing of data samples 700 through the sample addition circuit 601 is paused. At step 806, at least one additional sample 702 is created and output from the sample addition circuit 601. At step 808, passing of the data samples 700 through the sample addition circuit 601 to a receiver buffer 124 continues.

In an example, a sample addition circuit may be controlled by any combination of a control circuit, a control system, a control apparatus, a computer processor, a computer-readable medium carrying at least one instruction for execution by at least one processor, a logic circuit, a digital circuit, or an analog circuit. In an example, a control circuit for controlling sample addition circuit includes a threshold detector coupled to a receiver buffer or a sample addition circuit. In an example, the threshold detector is coupled to detect, and detects at least one of a quantity of data in the receiver buffer, an RDS rate, and an RCS rate.

In an example, the flowchart 800 may be implemented by any combination of a control circuit, a control system, a control apparatus, a computer processor, a computer-readable medium carrying at least one instruction for execution by at least one processor, a logic circuit, a digital circuit, or an analog circuit.

The rate of sample 702 addition may occur on a periodic or on an as-needed basis. Timing of sample 702 addition may be continuously variable to adjust for varying data rates of an RDS 122. Sample 702 addition may be based upon a rate of the RDS 122 or based upon a control signal output from a receiver RF section 120. A sample 702 addition rate may also be based on a fixed ratio of RCS 628 cycles to receiver codec 130 data input rate. A sample 702 addition rate may be based on a fixed ratio of RCS 628 cycles to RDS 122 data rate output from a receiver RF section 120 to ensure a constant MRCS 602 frequency relative to the RDS 122 rate.

In an example, a sample addition apparatus and/or method is part of an earpiece or headset that is Bluetooth-enabled for communicating among Bluetooth-enabled devices. In an example, a sample addition circuit is part of a wireless receiver, wireless transmitter, and/or wireless transceiver. In another example, a sample addition circuit is part of a computer, phone, telecommunications device, communication device, personal data assistant, television, and/or radio. In another example, a sample addition circuit apparatus and/or method described herein are used in a receiver, a transmitter, and/or a transceiver.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A buffer timing modification system, comprising:
   a data buffer;
   a clock signal generator configured to generate a clock signal;
   a switch coupled between the clock signal generator and the data buffer; and
   a control circuit coupled to the switch and configured to control the switch to interrupt application of the clock signal, to the data buffer, thereby preventing the data buffer from running empty when the clock signal has a clock rate that is different from a rate of data received by the data buffer,
   wherein the control circuit is configured to interrupt application of the clock signal for a fixed ratio of clock cycles relative to the data rate.

2. The system of claim 1, wherein the switch comprises a logic gate.

3. The system of claim 2, wherein the logic gate comprises an AND gate.

4. The system of claim 1, wherein the data buffer, the clock signal generator, the switch, and the control circuit are part of at least one of a wireless receiver, a wireless transmitter, and a wireless transceiver.

5. The system of claim 1, wherein the clock signal generator comprises a crystal-controlled oscillator.

6. The system of claim 1, wherein the clock signal generator is configured to generate the clock signal at a rate of at least one of 12 MHz, a harmonic of 12 MHz, 16.9344 MHz, and a harmonic of 16.9344 MHz.

7. The system of claim 1, wherein the data buffer is configured to receive at least one of audio samples and video samples.

8. A method of modifying buffer timing, comprising:
   receiving data, having a data rate, at a data buffer;
   applying a clock signal to the data buffer, wherein the clock signal has a clock rate that is not equal to the data rate;

clocking the data through the data buffer under control of the clock signal; and interrupting the application of the clock signal to the data buffer to prevent the data buffer from running empty, wherein the interrupting comprises interrupting the clock signal for a fixed ratio of clock cycles relative to the data rate.

9. The method as recited in claim 8, wherein the interrupting comprises interrupting the clock signal for an average of fourteen clock signal cycles for every one-hundred and twenty-eight samples of the data.

10. The method as recited in claim 8, wherein the interrupting is based upon the clock signal.

11. The method as recited in claim 8, wherein the interrupting comprises interrupting for at least one half-cycle of the clock signal.

12. The method as recited in claim 8, wherein the interrupting comprises interrupting based upon a quantity of the data in the data buffer.

13. A sample addition system, comprising:

a data buffer;

a sample addition circuit coupled to the data buffer;

a clock signal generator configured to supply a clock signal to the data buffer; and a control circuit coupled to the sample addition circuit and configured to control the sample addition circuit to insert samples into the data buffer based on a ratio of a clock signal rate to a data rate of data input to the data buffer, thereby preventing the data buffer from running empty when the clock signal has a clock rate that is different from a rate of data applied to the data buffer.

14. The system of claim 13 wherein the data buffer, the sample addition circuit, and the control circuit are part of at least one of a wireless receiver, a wireless transmitter, and a wireless transceiver.

15. The system of claim 13, wherein the data buffer is configured to receive at least one of audio samples and video samples.

16. The system of claim 13, wherein the control circuit includes a threshold detector coupled to at least one of the data buffer and the sample addition circuit.

17. The system of claim 16, wherein the threshold detector is configured to detect a quantity of data in the data buffer.

18. A method of sample addition, comprising:

receiving data, having a data rate, at a data buffer;

clocking data through the data buffer under control of a clock signal, wherein the clock signal has a clock rate that is not equal to the data rate; and adding samples to the data buffer to prevent the buffer from running empty, wherein the adding is based on a ratio of the clock rate to the data rate.

19. The method as recited in claim 18, wherein the data includes at least one of audio samples and video samples.

20. The method as recited in claim 18, further comprising detecting at least one of a quantity of data in the data buffer, the data rate, and the clock signal rate.

21. The method as recited in claim 20, wherein the adding is based on the detecting.

22. The method as recited in claim 18, wherein the adding is based on at least one of a quantity of data in the data buffer, the data rate, the clock signal rate, and a ratio of the clock signal rate to a coder/decoder data input rate.

* * * * *